United States Patent
Zheng et al.

(10) Patent No.: US 9,407,085 B2
(45) Date of Patent: Aug. 2, 2016

(54) CONTROLLER FOR A BRUSHLESS MOTOR

(71) Applicant: Dyson Technology Limited, Wiltshire (GB)

(72) Inventors: Libo Zheng, Swindon (GB); Yongji Zhou, Swindon (GB); Tuncay Celik, Swindon (GB)

(73) Assignee: Dyson Technology Limited, Malmesbury, Wiltshire (GB)

( * ) Notice: Subject to any disclaimer, the term of this patent is extended or adjusted under 35 U.S.C. 154(b) by 0 days.

(21) Appl. No.: 14/321,437

(22) Filed: Jul. 1, 2014

(65) Prior Publication Data
US 2015/0008855 A1    Jan. 8, 2015

(30) Foreign Application Priority Data
Jul. 2, 2013    (GB) .................................. 1311863.3

(51) Int. Cl.
| | | |
|---|---|---|
| *H02H 3/24* | (2006.01) | |
| *H02H 7/08* | (2006.01) | |
| *H02P 6/08* | (2016.01) | |
| *H02M 1/32* | (2007.01) | |
| *H02M 1/36* | (2007.01) | |
| *H02M 7/5387* | (2007.01) | |

(52) U.S. Cl.
CPC . *H02H 7/08* (2013.01); *H02M 1/32* (2013.01); *H02M 1/36* (2013.01); *H02M 7/5387* (2013.01); *H02P 6/085* (2013.01)

(58) Field of Classification Search
CPC .............. H02P 6/12; H02P 27/04; H02P 6/24
USPC ............ 318/254, 375, 439, 400.01, 432, 609, 318/99, 801, 400.21, 400.22; 363/40, 363/56.05, 95, 109; 361/86, 90, 91.1, 92, 361/21, 23, 88, 89; 327/142
See application file for complete search history.

(56) References Cited

U.S. PATENT DOCUMENTS

| | | | | |
|---|---|---|---|---|
| 4,780,656 A | * | 10/1988 | Mitchell .............. | H02H 7/0833 318/798 |
| 5,744,921 A | * | 4/1998 | Makaran ................... | H02P 1/22 318/400.21 |
| 6,215,261 B1 | * | 4/2001 | Becerra ..................... | 318/400.26 |
| 7,821,215 B2 | * | 10/2010 | Koehl ................. | F04D 15/0088 318/280 |

FOREIGN PATENT DOCUMENTS

JP    2010-158107    7/2010

OTHER PUBLICATIONS

Search Report mailed Jan. 20, 2014 directed towards GB Application No. 1311863.3; 1 page.

* cited by examiner

*Primary Examiner* — Antony M Paul
(74) *Attorney, Agent, or Firm* — Morrison & Foerster LLP

(57) ABSTRACT

A controller for a brushless motor that is configured to operate in normal mode or under-voltage mode. When operating in normal mode, the controller generates control signals for exciting a winding of the motor, monitors the magnitude of an input voltage, and switches to under-voltage mode in the event that the input voltage drops below an under-voltage threshold. When operating in under-voltage mode, the controller suspends excitation of the winding, monitors the magnitude of the input voltage, monitors the magnitude of a supply voltage used to power the controller, switches to normal mode in the event that the input voltage exceeds a restart threshold, and resets itself in the event that the supply voltage drops below a brown-out threshold.

11 Claims, 4 Drawing Sheets

CONTROLLER FOR A BRUSHLESS MOTOR

REFERENCE TO RELATED APPLICATION

This application claims priority of United Kingdom Application No. 1311863.3, filed Jul. 2, 2013, the entire contents of which are incorporated herein by reference.

FIELD OF THE INVENTION

The present invention relates to a controller for a brushless motor.

BACKGROUND OF THE INVENTION

The controller for a brushless motor may be configured such that, when the supply voltage used to power the controller drops below a brown-out threshold, the controller resets itself. This then has the advantage that, when the controller is powered off, the controller resets itself in readiness for power on.

A problem with this arrangement is that, as the supply voltage begins to drop following a power off, the controller may behave erratically before the supply voltage reaches the brown-out threshold. In order to solve this problem, the controller may be configured to monitor an input voltage and halt operation should the input voltage drop below an under-voltage threshold. The under-voltage threshold is then set such that controller halts operation at a higher supply voltage than that of the brown-out threshold. Once operation is halted, the controller waits until such time as the supply voltage drops below the brown-out threshold, at which point the controller resets itself.

A problem with this arrangement is that it may take a relatively long period of time (e.g. several seconds) after the input voltage has dropped below the under-voltage threshold before the supply voltage drops below the brown-out threshold. During this time it is not possible to restart the controller. Accordingly, should an attempt be made to power on the controller, the controller will fail to restart. Worse, if an attempt is made to power on the controller, the supply voltage will actually rise and thus fail to drop below the brown-out threshold.

SUMMARY OF THE INVENTION

The present invention provides a controller for a brushless motor, the controller being configured to operate in normal mode and under-voltage mode, wherein when operating in normal mode the controller generates control signals for exciting a winding of the motor, monitors the magnitude of an input voltage, and switches to under-voltage mode in the event that the input voltage drops below an under-voltage threshold, and when operating in under-voltage mode the controller suspends excitation of the winding, monitors the magnitude of the input voltage, monitors the magnitude of a supply voltage used to power the controller, switches to normal mode in the event that the input voltage exceeds a restart threshold, and resets itself in the event that the supply voltage drops below a brown-out threshold.

The under-voltage threshold may be set at a level that prevents the controller from behaving erratically. The controller then switches to under-voltage mode and suspends excitation of the phase winding before any erratic behaviour can occur. When operating in under-voltage mode, the controller continues to monitor the input voltage. Should the input voltage subsequently exceed the restart threshold, the controller reverts to normal mode. The controller is therefore able to restart without having to wait for the supply voltage to drop below the brown-out threshold. As a result, the controller is able to respond much quicker to a power off and on. Additionally, should an attempt be made to power on the controller after the input voltage has dropped below the under-voltage threshold, the controller is not locked in a condition in which the controller is waiting for the supply voltage to brown-out.

When switching from under-voltage mode to normal mode, there may be a drop in the magnitude of the input voltage due to the increased load that arises from excitation of the winding. This drop may cause the input voltage to drop below the restart threshold. If the restart threshold and the under-voltage threshold were identical, the controller would then switch to under-voltage mode. Excitation of the winding would then be suspended, causing the input voltage to increase. The input voltage would then exceed the restart threshold and thus the controller would again switch to normal mode, at which point the controller would again excite the winding. It is therefore possible that the controller may get trapped between under-voltage mode and normal mode. In order to prevent this from occurring, the controller may employ a restart threshold that is greater than the under-voltage threshold. As a result, should there be a drop in the input voltage on switching to normal mode, the input voltage does not to drop below the under-voltage threshold.

When operating in normal mode, the controller may switch to error mode in the event that the controller detects an error. For example, the controller may determine that a parameter of the motor (e.g. speed or temperature) is outside normal operating limits. When operating in error mode, the controller suspends excitation of the winding so as to prevent possible damage to the motor. The controller then monitors the magnitude of the input voltage, and switches to under-voltage mode in the event that the input voltage drops below an under-voltage threshold greater than that used in normal mode. Accordingly, when operating in error mode, the controller requires the input voltage to drop below the under-voltage threshold before restarting. However, since excitation of the winding is suspended, the input voltage decays relatively slowly. If the under-voltage threshold used in normal mode were also used in error mode, it would take the controller a relatively long period of time to switch to under-voltage mode. If the input voltage were to rise during this period (e.g. if an attempt was made to power on the controller), the under-voltage threshold would never be reached. By employing a higher under-voltage threshold when operating in error mode, the controller is able to switch more quickly to under-voltage mode.

The magnitude of the input voltage during power on may differ. For example, the input voltage may be provided by a battery pack that discharges with use. If the controller were to use the same under-voltage threshold when operating in error mode, the controller will take a longer period of time to switch to under-voltage mode when the input voltage is higher. In order to solve this problem, the controller may use an under-voltage threshold that depends on the magnitude of input voltage. In particular, the controller may use a higher under-voltage threshold in response to a higher input voltage. Accordingly, when operating in error mode, the controller may suspend excitation of the winding, measure the magnitude of the input voltage, select an under-voltage threshold that depends on the measured input voltage, subsequently monitor the magnitude of the input voltage, and switch to under-voltage mode in the event that the input voltage drops below the selected under-voltage threshold.

The controller may use an under-voltage threshold that differs from the input voltage by a fixed amount. This then ensures that, irrespective of the input voltage, the period of time taken for the controller to enter under-voltage mode is roughly the same.

The controller may comprise a digital-to-analogue converter (DAC) configured to output a voltage corresponding to the under-voltage threshold or the restart threshold, and a comparator configured to compare the output voltage of the DAC with the input voltage. The controller then determines that the input voltage has dropped below the under-voltage threshold or has exceeded the restart threshold when the output of the comparator changes. The use of a DAC and a comparator provides a relatively quick and simple method of comparing the input voltage against different thresholds. In particular, by changing the level of the DAC, the under-voltage threshold used in normal mode or error mode, and the restart threshold used in under-voltage mode may be generated using the same peripherals.

When operating in error mode, the controller may use an under-voltage threshold that differs from the magnitude of the input voltage by a fixed amount. In this instance, the controller may increase the level of the DAC until the output of the comparator changes. When the comparator changes, this implies that the voltage output by the DAC corresponds roughly to that of the input voltage. In response to the change in the output of the comparator, the controller then decreases the level of the DAC by a fixed amount. As a result, the output voltage of the DAC differs from the input voltage by a fixed amount. This then has the benefit that the same peripherals may be used not only to select different thresholds, but also to select a threshold that depends on the magnitude of the input voltage.

The controller described in the introduction may additionally or alternatively halt operation in the event that the controller detects an error. This then has the benefit of protecting the motor from potential damage. Once operation is halted, the controller waits until such time as the supply voltage drops below the brown-out threshold before resetting. The controller therefore requires a power off before it can reset.

A problem with this arrangement is that, since operation has been halted at a time when the controller is powered on, it may take a relatively long period of time for the supply voltage to drop below the brown-out threshold after a power off. During this time it is not possible to restart the controller. Accordingly, should an attempt be made to power on the controller, the controller will fail to restart. Worse, if an attempt is made to power on the controller, the supply voltage will actually rise and thus fail to drop below the brown-out threshold.

Accordingly, the present invention also provides a controller for a brushless motor, the controller being configured to operate in normal mode, error mode and under-voltage mode, wherein when operating in normal mode the controller generates control signals for exciting a winding of the motor, and switches to error mode in the event that an error is detected, when operating in error mode the controller suspends excitation of the winding, measures the magnitude of an input voltage, selects an under-voltage threshold that differs from the measured input voltage by a fixed amount, monitors the magnitude of the input voltage, and switches to under-voltage mode in the event that the input voltage drops below the under-voltage threshold, and when operating in under-voltage mode the controller monitors the magnitude of the input voltage, monitors the magnitude of a supply voltage used to power the controller, switches to normal mode in the event that the input voltage exceeds a restart threshold, and resets itself in the event that the supply voltage drops below a brown-out threshold.

The controller therefore requires a power off before the controller can be restarted. This then has the advantage that a user is made fully aware that an error has occurred. The user is then able to remedy the problem before attempting to restart the controller. On switching to error mode, the controller suspends excitation of the winding. Consequently, the input voltage decays at a relatively slow rate following a power off. The magnitude of the input voltage during power on may differ. For example, the input voltage may be provided by a battery pack that discharges with use. If the controller were to use the same under-voltage threshold when operating in error mode, the controller would take a longer period of time to switch to under-voltage mode when the input voltage is higher. By employing an under-voltage threshold that differs from the input voltage by a fixed amount, the period of time required for the controller to enter under-voltage mode is roughly the same, irrespective of the input voltage. After switching to under-voltage mode, the controller continues to monitor the input voltage. Should the input voltage rise and exceed the restart threshold, the controller reverts to normal mode. The controller is therefore able to restart without having to wait for the supply voltage to drop below the brown-out threshold. As a result, the controller is able to respond much quicker to a power off and on following an error. Additionally, should an attempt be made to power on the controller after the input voltage has dropped below the under-voltage threshold, the controller is not locked in a condition in which the controller is waiting for the supply voltage to brown-out.

The controller may comprise a digital-to-analogue converter (DAC) configured to output a voltage corresponding to the under-voltage threshold or the restart threshold, and a comparator configured to compare the output voltage of the DAC with the input voltage. The controller then determines that the input voltage has dropped below the under-voltage threshold or has exceeded the restart threshold when the output of the comparator changes. The use of a DAC and a comparator provides a relatively quick and simple method of comparing the input voltage against different thresholds. In particular, by changing the level of the DAC, the under-voltage threshold used in normal mode or error mode, and the restart threshold used in under-voltage mode may be generated using the same peripherals.

When operating in error mode, the controller may increase the level of the DAC until the output of the comparator changes. When the comparator changes, this implies that the voltage output by the DAC corresponds roughly to that of the input voltage. In response to the change in the output of the comparator, the controller decreases the level of the DAC by a fixed amount. As a result, the output voltage of the DAC differs from the input voltage by a fixed amount. The controller then switches to under-voltage mode in the event that the output of the comparator subsequently changes. This then has the benefit that the same peripherals may be used not only to select different thresholds, but also to select an under-voltage threshold that depends on the magnitude of the input voltage.

BRIEF DESCRIPTION OF THE DRAWINGS

In order that the present invention may be more readily understood, an embodiment of the invention will now be described, by way of example, with reference to the accompanying drawings, in which.

DETAILED DESCRIPTION OF THE INVENTION

Figure 1:
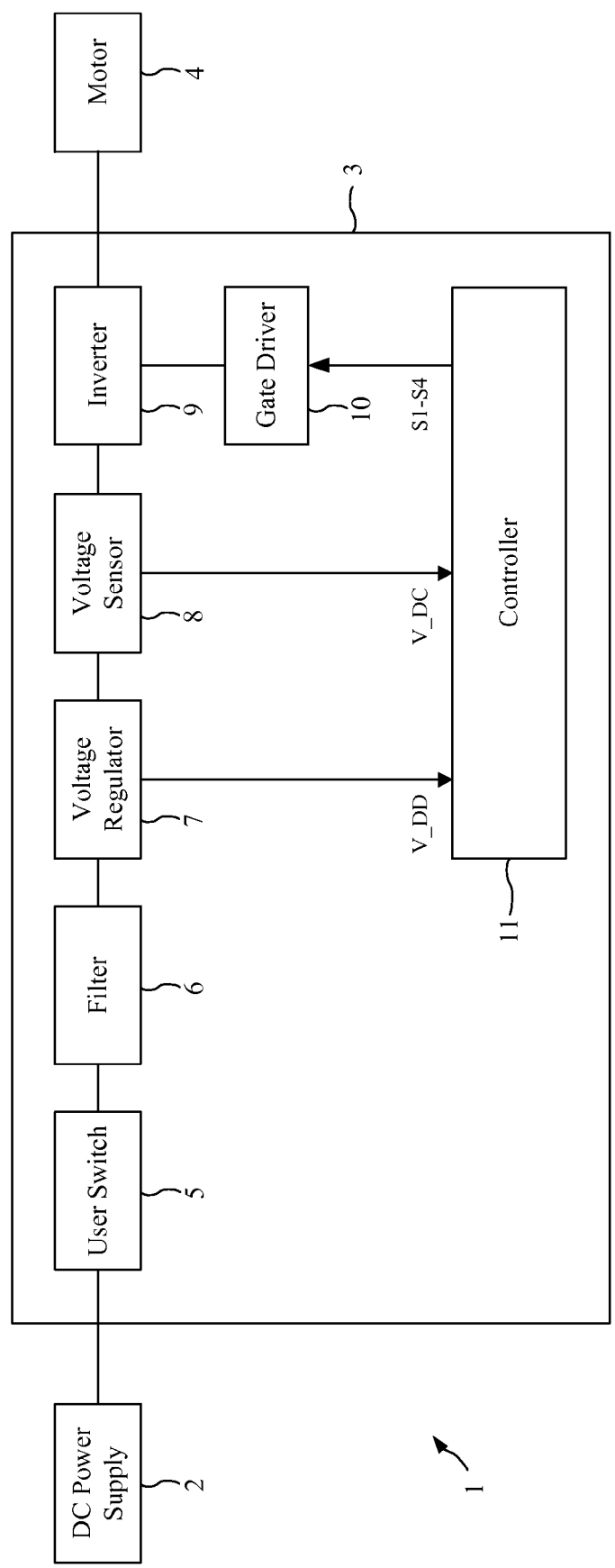
FIG. 1 is a block diagram of a motor assembly in accordance with the present invention.
Figure 2:
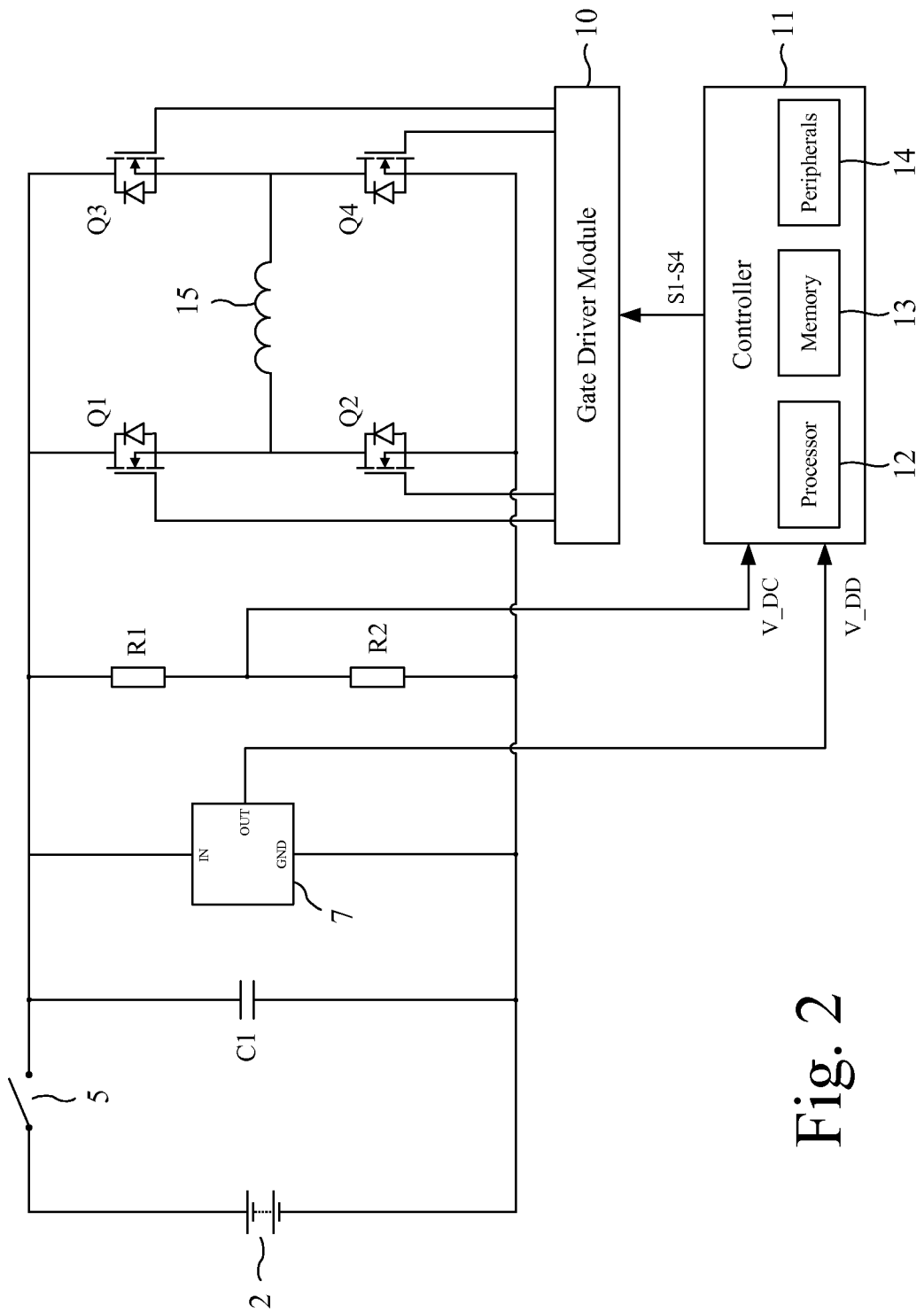
FIG. 2 is a schematic diagram of the control circuit of the motor assembly.

The motor assembly 1 of FIGS. 1 and 2 comprises a power supply 2, a control circuit 3, and a brushless motor 4.

The power supply 2 comprises a battery pack that supplies a DC voltage.

The control circuit 3 comprises a user switch 5, a filter 6, a voltage regulator 7, a voltage sensor 8, an inverter 9, a gate driver module 10 and a controller 11.

The user switch 5 is connected in series with the power supply 2 and is to power on and off the controller 11.

The filter 6 comprises a link capacitor C1 that smoothes the relatively high-frequency ripple that arises from switching of the inverter 9.

The voltage regulator 7 outputs a supply voltage, V_DD, that is used to power the controller 11.

The voltage sensor 8 comprises a potential divider R1,R2 that outputs a voltage signal, V_DC, which represents a scaled-down measure of the DC link voltage.

The inverter 9 comprises a full bridge of four power switches Q1-Q4 that couple a phase winding 15 of the motor 4 to the DC link voltage.

The gate driver module 10 drives the opening and closing of the power switches Q1-Q4 in response to control signals S1-S4 received from the controller 11.

The controller 14 comprises a microcontroller having a processor 12, a memory device 13, and a plurality of peripherals 14 (e.g. ADC, DAC, comparators, timers etc.). The memory device 13 stores instructions for execution by the processor 12, as well as control parameters and lookup tables that are employed by the processor 12 during operation. The controller 11 is responsible for controlling the operation of the motor 4 and generates one or more control signals S1-S4 for controlling the power switches Q1-Q4 of the inverter. The control signals are output to the gate driver module 10, which in response drives the opening and closing of the switches Q1-Q4.

Figure 3:
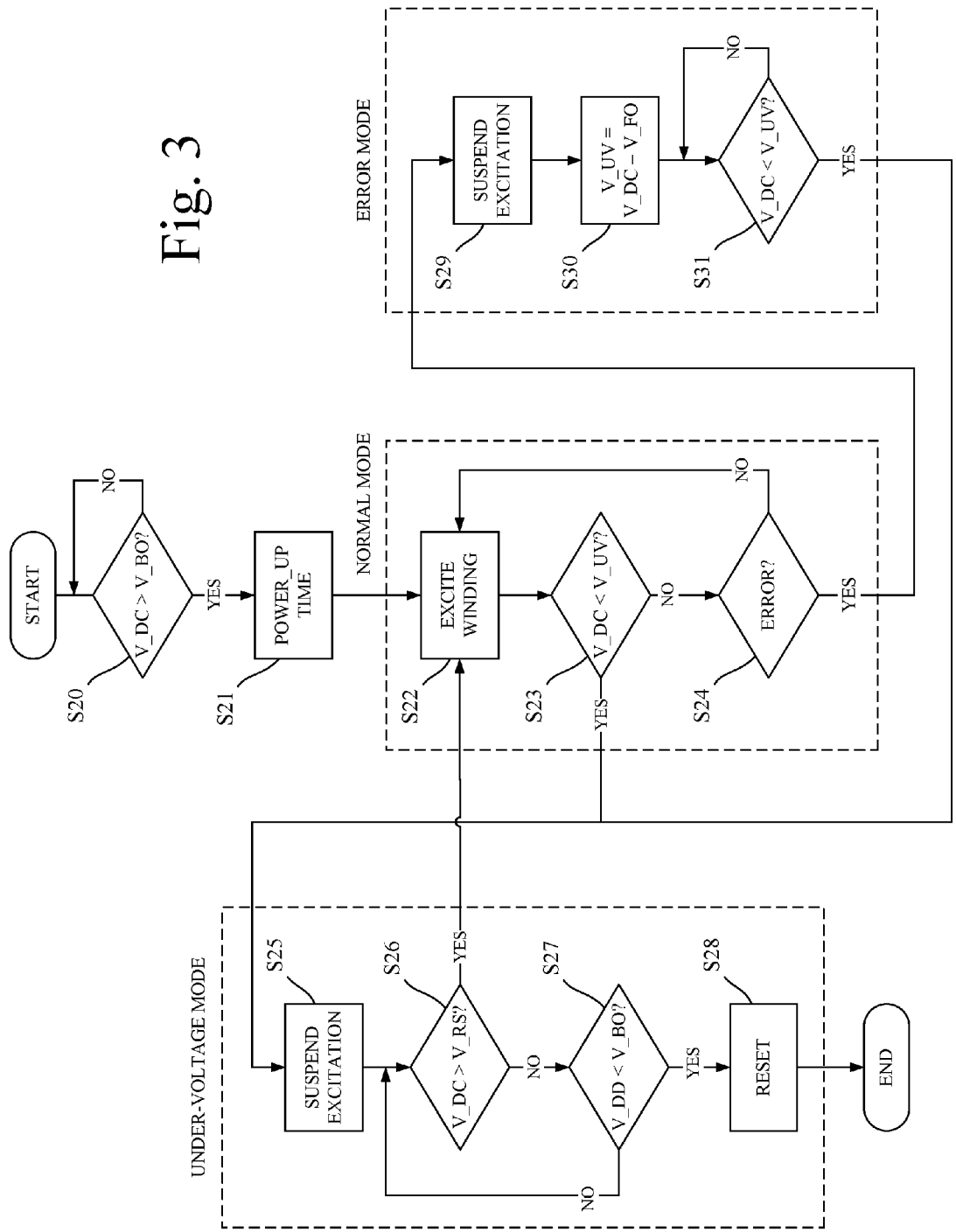
FIG. 3 is a flow diagram illustrating the operation of the controller of the control circuit.

Operation of the controller 11 will now be described with reference to FIG. 3.

When the user switch 5 is open and the controller 11 is powered off, the controller 11 is held in reset. When the user switch 5 is subsequently closed, the supply voltage, V_DD, used to power the controller 11 increases. When the supply voltage exceeds a brown-out threshold, V_BO, (S20) the controller 11 loads a timer with a nominal power-up period. The controller 11 continues to be held in reset during the power-up period (S21). This then allows the supply voltage, V_DD, to rise to an acceptable level before the controller 11 is released from reset. At the end of the power-up period (S21), the controller 11 is released from reset and the controller 11 switches to normal mode, whereupon the controller 11 executes code stored in the memory device 13.

When operating within normal mode, the controller 11 generates control signals for exciting the phase winding 15, thus causing the motor 4 to be driven forwards. The particular manner in which the controller 11 excites the phase winding 15 during normal mode is not pertinent to the present invention.

When operating in normal mode, the controller 11 monitors the DC link voltage, V_DC. Should the DC link voltage drop below an under-voltage threshold, V_UV, (S23) the controller 11 switches to under-voltage mode. On entering under-voltage mode, the controller 11 suspends excitation of the phase winding 15 (S25) by opening all power switches Q1-Q4 of the inverter 9. The controller 11 then continues to monitor the DC link voltage, V_DC, as well as the supply voltage, V_DD. If the DC link voltage exceeds a restart threshold, V_RS, (S26) the controller 11 reverts to normal mode. Alternatively, should the supply voltage drop below the brown-out threshold, V_BO, (S27) the controller 11 resets itself.

When the user switch 5 is opened during normal mode, the controller 11 continues to operate as normal until such time as the DC link voltage drops below the under-voltage threshold (S23). Accordingly, on opening the user switch 5, the controller 11 continues to excite the phase winding 15. As a result, the DC link voltage drops rapidly. After a relatively short period of time, the DC link voltage drops below the under-voltage threshold. The controller 11 then switches to under-voltage mode, whereupon excitation of the phase winding is suspended (S25). The DC link voltage then decays at a much slower rate. If the user switch 5 remains open, the supply voltage will eventually decay to a level below the brown-out threshold, at which point the controller resets itself (S28). If, on the other hand, the user switch 5 is closed before the controller 11 resets, the DC link voltage and the supply voltage increase. The DC link voltage rises quickly to a level greater than the restart threshold and thus the controller 11 switches to normal mode.

The under-voltage threshold is set at a level that prevents the controller 11 from behaving erratically. So, for example, the voltage regulator 7 may output a nominal supply voltage, V_DD, of 5 V, and the brown-out threshold, V_BO, may be set at 2.5 V. The controller 11, however, may begin to behave erratically when the supply voltage drops below 5 V. The under-voltage threshold is therefore set at a level below which the voltage regulator 7 is unable to maintain a supply voltage of 5 V. Consequently, the controller 11 suspends excitation of the phase winding 15 (S25) before the supply voltage drops below 5 V.

On entering under-voltage mode, the controller 11 continues to monitor the DC link voltage. Should the DC link voltage exceed the restart threshold (S26), the controller 11 reverts to normal mode. The restart threshold, V_RS, is higher than the under-voltage threshold, V_UV. Consequently, the DC link voltage exceeds the restart threshold only when the user switch 5 is closed again. The controller 11 is therefore able to distinguish between an open switch and a closed switch. On recognising that the user switch 5 is closed, the controller 11 reverts to normal mode. The controller 11 is therefore able to restart without having to wait for the supply voltage to drop below the brown-out threshold.

The restart threshold is higher than the under-voltage threshold. If the restart threshold were identical to the under-voltage threshold then one of two situations might occur. First, when the user switch 5 is opened within normal mode, the DC link voltage quickly drops to the under-voltage threshold. The controller 11 then switches to under-voltage mode and suspends excitation of the phase winding 15. At this point, the motor 4 is still rotating and thus the energy stored within the motor 4 (e.g. back EMF for a permanent-magnet motor, or magnetic energy for a reluctance motor) is returned to the voltage lines via the body diodes of the power switches Q1-Q4. The stored energy may boost the DC link voltage to a level greater than the restart threshold. If the restart threshold and the under-voltage threshold were identical, the controller 11 would then switch back to normal mode, which is undesirable. Nevertheless, as will now be explained, this does not necessarily present a problem. On switching back to normal mode, the controller 11 excites the phase winding 15. Since the user switch 5 is still open, the DC link voltage drops quickly to the under-voltage threshold and the stored energy is almost entirely dissipated. The controller 11 then reverts to under-voltage mode and suspends phase excitation. The stored energy is now insufficient to boost the DC link voltage to a level greater than the restart threshold. Consequently, the controller 11 remains in under-voltage mode until either the user switch 5 is closed or the supply voltage drops below the brown-out threshold. Second, consider the situation in which the user switch 5 is closed during under-voltage mode. On closing the switch 5, the DC link voltage increases and eventually exceeds the restart threshold. The controller 11, in response, switches to normal mode and attempts to excite the phase winding 15. As a result, the load on the power supply 2 increases. In the present embodiment, the power supply 2 comprises a battery pack and thus the increase in load causes the DC link voltage to drop. When the voltage of the power supply 2 is relatively low, the drop in the DC link voltage may cause the DC link voltage to drop below the restart threshold. If the restart threshold and the under-voltage threshold were identical, the controller 11 would then switch to under-voltage mode. Excitation of the phase winding 15 would then be suspended. This in turn would cause the load on the power supply 2 to decrease and thus the DC link voltage to increase. The DC link voltage would then exceed the restart threshold and thus the controller 11 would again switch to normal mode, at which point the controller 11 would again excite the phase winding 15. It is therefore possible that the controller 11 may get trapped between under-voltage mode and normal mode, causing the motor to stutter 4. By employing a restart threshold that is higher than the under-voltage threshold, the two situations described above may be avoided. In particular, the difference between the restart threshold and the under-voltage threshold may be set such that, even with the drop in the DC link voltage due to phase excitation, the DC link voltage does not drop below the under-voltage threshold. In spite of the advantages in having a higher restart threshold, it may be possible to employ a restart threshold that is identical to the under-voltage threshold. As explained above, the first situation does not present a problem, and the second situation may be avoided in a number of ways. For example, the power supply 2 may output a supply voltage only when the no-load voltage of the power supply 2 exceeds the restart threshold. Alternatively, the power supply 2 may output a digital signal that is pulled logically high only when the no-load voltage of the power supply 2 exceeds the restart threshold. The controller 11 then polls the signal of the power supply 2 when operating in under-voltage mode and/or normal mode in order to determine whether the voltage of the power supply 2 is sufficiently high to drive the motor 4.

When operating within normal mode, the controller 11 may detect that an error has occurred (S24). For example, the controller 11 may sense that a parameter of the motor (e.g. speed or temperature) is outside normal operating limits. Should the controller 11 detect that an error has occurred (S24), the controller 11 switches to error mode. On entering error mode, the controller 11 suspends excitation (S29) of the phase winding 15 by opening all power switches Q1-Q4 of the inverter 9. The controller 11 then monitors the DC link voltage and switches to under-voltage mode when the DC link voltage drops below an under-voltage threshold (S31).

When the controller 11 enters error mode, the user switch 5 is typically closed and thus neither the DC link voltage nor the supply voltage decay. The user is therefore required to open the user switch 5 before the controller 11 and the motor 4 can be restarted. This then has the advantage that the user is made fully aware that an error has occurred. The user is then able to remedy the problem before attempting to restart the motor 4. When operating within normal mode, the controller 11 continues to excite the phase winding 15 when the user switch 5 is opened. As a result, the DC link voltage drops quickly to a level below the under-voltage threshold, i.e. the controller 11 quickly switches to under-voltage mode in response to opening the user switch 5. By contrast, when the controller 11 enters error mode, the controller 11 suspends excitation of the phase winding 15. Consequently, when the user switch 5 is subsequently opened, the DC link voltage decays at a much slower rate. The DC link voltage still decays owing to the current drawn by components of the control circuit 3, e.g. the voltage sensor 8, the controller 11 and any other components that are powered by the voltage regulator 7. Nevertheless, the rate at which the DC link voltage decays is much slower than that during normal mode. Accordingly, if the under-voltage threshold used in normal mode were also used in error mode, it would take a longer period of time for the controller 11 to switch to under-voltage mode. If the user switch 5 were closed during this period, the DC link voltage would rise and thus the under-voltage threshold would never be reached. The controller 11 therefore employs a higher under-voltage threshold when operating in error mode. Moreover, as will now be explained, the controller 11 employs a variable under-voltage threshold when operating in error mode.

The power supply 2 comprises a battery pack that discharges with use. Consequently, the magnitude of the DC link voltage on switching to error mode is variable. If the controller 11 were to use the same under-voltage threshold when operating in error mode, the controller 11 would take a longer period of time to switch to under-voltage mode when the DC link voltage is higher. The controller 11 therefore employs an under-voltage threshold that depends on the magnitude of the DC link voltage. More particularly, the controller 11 employs a higher under-voltage threshold in response to a higher DC link voltage.

On entering error mode, the controller 11 suspends excitation of the phase winding 15 (S29). The controller 11 then measures the magnitude of the DC link voltage, V_DC. The controller 11 subtracts a fixed offset value, V_FO, from the measured DC link voltage to obtain the under-voltage threshold (S30), i.e. V_UV=V_DC−V_FO. The controller 11 then monitors the DC link voltage. Should the DC link voltage drop below the under-voltage threshold (S31), the controller 11 switches to under-voltage mode. So, for example, on entering error mode, the controller 11 may measure a DC link voltage of 20 V and the controller 11 may employ a fixed offset value of 3 V. The controller 11 then employs an under-voltage threshold of 17 V.

The controller 11 therefore employs a variable under-voltage threshold when operating in error mode. This is in contrast to normal mode where the controller 11 employs a fixed under-voltage threshold. By employing a variable under-voltage threshold, the controller 11 is able to switch to under-voltage mode much quicker in response to a power off. The fixed offset value, V_FO, is chosen such that (i) the controller 11 enters under-voltage mode only after the user switch 5 has been opened, and (ii) once the switch 5 has been opened, the controller 11 switches to under-voltage mode relatively quickly. If the fixed offset value is too small (i.e. if the calculated under-voltage threshold is relatively close to the measured DC link voltage) it is possible that, owing to errors in measuring the DC link voltage and/or changes in the DC link voltage over time, the controller 11 may enter under-voltage mode whilst the user switch 5 is still closed. If, on the other hand, the fixed offset value is too large (i.e. if the calculated under-voltage threshold is relatively far from the measured DC link voltage) it will take a longer period of time for the controller 11 to enter under-voltage mode on opening the user switch 5.

Although the controller 11 employs a variable under-voltage threshold when operating in error mode, it is not necessary for the controller 11 to also employ a variable restart threshold when operating in under-voltage mode. As noted above, the restart threshold is typically set at a few volts higher than the under-voltage threshold used in normal mode. Since the under-voltage threshold used in error mode is higher than that used in normal mode, it is quite possible that the restart voltage will be lower than the under-voltage threshold used in error mode. Nevertheless, as will now be explained, this does not represent a problem. When the user switch 5 is opened within error mode, the DC link voltage decreases and, after a relatively short period of time, drops below the under-voltage threshold. The controller 11 then switches to under-voltage mode. The controller 11 then monitors the DC link voltage and reverts to normal mode if the DC link voltage is greater than the restart voltage. In this instance, the under-voltage threshold used in error mode is higher than the restart voltage. As a result, on entering under-voltage mode, the DC link voltage is higher than the restart voltage and thus the controller 11 immediately switches to normal mode. The controller 11 then attempts to excite the phase winding 15 (S22). However, since the user switch 5 is still open, the DC link voltage drops rapidly to the under-voltage threshold used in normal mode. The controller 11 then enters under-voltage mode once again. However, this time the DC link voltage is lower than the restart threshold and thus the controller 11 remains in under-voltage mode until either the user switch 5 is closed or until the supply voltage drops below the brown-out threshold. It is not therefore necessary for the controller 11 to employ a different restart threshold when operating in under-voltage mode, which then simplifies the operation of the controller 11. Nevertheless, if the behaviour described above is undesirable then the controller 11 could conceivably employ a variable restart threshold, e.g. by adding a fixed value to the under-voltage threshold currently being used by the controller 11.

The power supply 2 comprises a battery pack that discharges with use. It is for this reason that the controller 11 employs a variable under-voltage threshold when operating in error mode. If, however, the power supply 2 were to provide a regular DC voltage then the controller 11 might alternatively employ a fixed under-voltage threshold.

Figure 4:
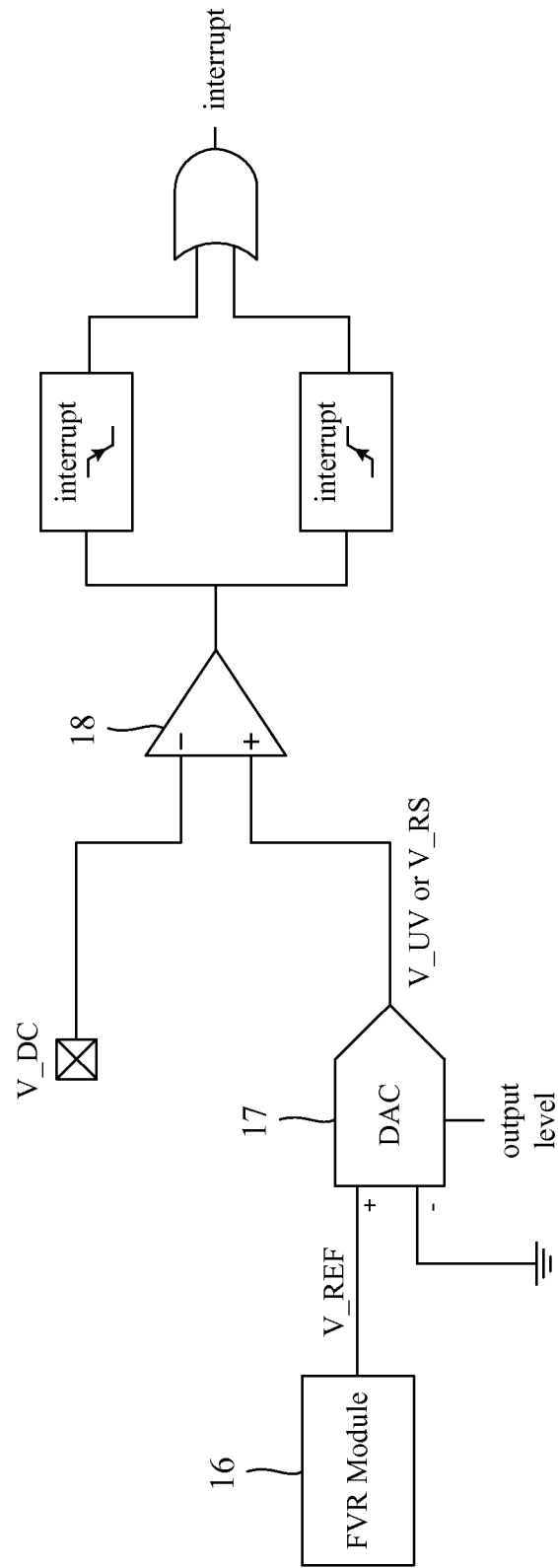
FIG. 4 illustrates peripherals of the controller configured to monitor the magnitude of an input voltage signal.

A particular method of implementing the above-described schemes will now be described with reference to FIG. 4.

The peripherals 14 of the controller 11 include a fixed voltage reference (FVR) module 16, a digital-to-analogue converter (DAC) 17, and a comparator 18. The FVR module 16 outputs a stable reference voltage, V_REF, which is input to the DAC 17. The DAC 17 has a plurality of output levels that may be selected by the processor 12. The comparator 18 compares the output of the DAC 17 with the DC link voltage, V_DC. When operating in normal mode, the processor 12 selects an output level for the DAC 17 that corresponds to the under-voltage threshold, V_UV, used in normal mode. When the DC link voltage drops below the under-voltage threshold, the comparator 18 toggles its output. This in turn generates a software interrupt. In servicing the interrupt, the processor 12 switches to under-voltage mode. The processor 12 then suspends excitation of the phase winding 15. The processor 12 additionally selects a different output level for the DAC 17 that corresponds to the restart threshold, V_RS, used in under-voltage mode. If the DC link voltage rises above the restart threshold, the comparator 18 again toggles its output, which generates a further interrupt. In servicing the further interrupt, the processor 12 reverts to normal mode. In the event that an error occurs during normal mode, the processor 12 switches to error mode and suspends excitation of the phase winding 15. The processor 12 then increments the output level of the DAC 17 until such time as the output of the comparator 18 changes. When the output of the comparator 18 changes, the processor 12 determines that the magnitude of the DC link voltage corresponds approximately to that output by the DAC 17, i.e. the voltage output by the DAC 17 provides a measure of the DC link voltage. The processor 12 then decreases the output level of the DAC 17 by a fixed amount. This causes the voltage output by the DAC 17 to decrease by the fixed offset value, V_FO. The voltage output by the DAC 17 then corresponds to the under-voltage threshold, V_UV. When the DC link voltage drop below the under-voltage threshold, the comparator 18 again toggles its output causing an interrupt to be generated. In servicing the interrupt, the processor 12 switches to under-voltage mode.

The use of a DAC 17 (operating on fixed reference voltage) and a comparator 18 provides a quick and relatively simple method of comparing the DC link voltage against different thresholds. In particular, by changing the output level of the DAC 17, the fixed under-voltage threshold used in normal mode, the variable under-voltage threshold used in error mode, and the restart threshold used in under-voltage mode may be generated using the same peripherals. An alternative method of implementing the above-described schemes would be to employ an analogue-to-digital converter (ADC) that converters the DC link voltage, V_DC, into a digital value. The processor 12 would then compare the digital value of the DC link voltage against the various thresholds. However, the response of the ADC and processor to changes in the DC link voltage will typically be slower than that of the DAC 17 and the comparator 18. This in turn may have adverse consequences. For example, consider the situation in which an error has occurred. On entering error mode, the controller 11 suspends excitation of the phase winding 15 and waits for the DC link voltage to drop below the under-voltage threshold. The user, recognising that an error has occurred, addresses the problem causing the error and then quickly opens and closes the user switch 5 in order to restart the motor 4. However, owing to the relatively slow response time of the ADC, it is quite possible that the ADC will fail to recognise that the DC link voltage dropped momentarily below the under-voltage threshold. As a result, the controller 11 will fail to restart. In contrast, when employing a DAC 17 and a comparator 18, the output level of the DAC 17 is set to the required under-voltage threshold on entering error mode. At this stage, the user switch is still closed and thus the period of time required to configure the DAC 17 has no adverse consequences. After the output level of the DAC 17 has been set, the comparator 18 continually compares the DC link voltage with the output of the DAC 17. Owing to the relatively fast response time of the comparator 18, the comparator 18 is able to determine if the DC link voltage has dropped below the under-voltage threshold, even if only for a short time. As a result, the controller 11 is able to respond to the quick opening and closing of the user switch 5.

In comparison to the controller described in the introduction, the controller 11 of the present invention is better able to respond to a quick power off and on. In particular, when the user switch 5 is opened during normal mode, the controller 11 continues to excite the phase winding 15 and thus the DC link voltage drops quickly to a level below the under-voltage threshold. The controller 11 then suspends excitation, monitors the DC link voltage, and reverts to normal mode should the DC link voltage exceed the restart threshold. Accordingly, should the user switch 5 be closed before the supply voltage has dropped below the brown-out threshold, the controller 11 nevertheless restarts. In contrast, the controller described in the introduction is unable to restart until the supply voltage drops below the brown-out threshold. However, owing to the link capacitor C1, this may take a relatively long period of time (e.g. several seconds) during which the user is unable to use the motor assembly.

Should an error occur, the controller 11 of the present invention suspends excitation of the phase winding 15 so as to protect the motor assembly 1 from potential damage. The controller 11 then monitors the DC link voltage and switches to under-voltage mode should the DC link voltage drop below an under-voltage threshold. However, the under-voltage threshold used in error mode is higher than that used in normal mode. As a result, the controller 11 is able to switch relatively quickly to under-voltage mode in spite of the fact that excitation has been suspended and thus the DC link voltage decays relatively slowly. Moreover, since the magnitude of the DC link voltage may vary on entering error mode, the use of a variable under-voltage threshold ensures that, irrespective of the magnitude of the DC link voltage, the controller 11 is able to switch relatively quickly to under-voltage mode. After switching to under-voltage mode, the controller 11 again monitors the DC link voltage and reverts to normal mode should the DC link voltage exceed the restart threshold. The controller 11 is not therefore required to wait for the supply voltage to brown-out before the controller 11 can be restarted. As a result, the controller 11 is better able to respond to a quick power off and on of the controller 11 following an error.

The invention claimed is:

1. A controller for a brushless motor, the controller being configured to operate in normal mode, error mode, and under-voltage mode, wherein:
   when operating in normal mode the controller generates control signals for exciting a winding of the motor, monitors the magnitude of an input voltage, switches to error mode in the event that the controller detects an error, and switches to under-voltage mode in the event that the input voltage drops below an under-voltage threshold;
   when operating in error mode the controller suspends excitation of the winding monitors the magnitude of the input voltage, and switches to under-voltage mode in the event that the input voltage drops below an under-voltage threshold greater than that used in normal mode; and
   when operating in under-voltage mode the controller suspends excitation of the winding, monitors the magnitude of the input voltage, monitors the magnitude of a supply voltage used to power the controller, switches to normal mode in the event that the input voltage exceeds a restart threshold, and resets itself in the event that the supply voltage drops below a brown-out threshold.

2. The controller of claim 1, wherein the restart threshold is greater than the under-voltage threshold used in normal mode.

3. The controller of claim 1, wherein when operating in error mode the controller uses an under-voltage threshold that depends on the magnitude of input voltage.

4. The controller of claim 1, wherein when operating in error mode the controller measures the magnitude of the input voltage, and uses an under-voltage threshold that differs from the measured input voltage by a fixed amount.

5. The controller of claim 1, wherein the controller comprises a digital-to-analogue converter (DAC) configured to output a voltage having a magnitude that corresponds to the under-voltage threshold or the restart threshold, and a comparator configured to compare the output voltage of the DAC with the input voltage, and the controller determines that the input voltage has dropped below the under-voltage threshold or has exceeded the restart threshold when the output of the comparator changes.

6. The controller of claim 5, wherein the controller uses an under-voltage threshold that differs from the magnitude of the input voltage by a fixed amount, the controller increases the level of the DAC until the output of the comparator changes, and in response to the change the controller decreases the level of the DAC by a fixed amount such that the output voltage of the DAC differs from the input voltage by a fixed amount.

7. A controller for a brushless motor, the controller being configured to operate in normal mode, error mode and under-voltage mode, wherein:
   when operating in normal mode the controller generates control signals for exciting a winding of the motor, and switches to error mode in the event that an error is detected;
   when operating in error mode the controller suspends excitation of the winding, measures the magnitude of an input voltage, selects an under-voltage threshold that differs from the measured input voltage by a fixed amount, monitors the magnitude of the input voltage, and switches to under-voltage mode in the event that the input voltage drops below the under-voltage threshold; and
   when operating in under-voltage mode the controller monitors the magnitude of the input voltage, monitors the magnitude of a supply voltage used to power the controller, switches to normal mode in the event that the input voltage exceeds a restart threshold, and resets itself in the event that the supply voltage drops below a brown-out threshold.

8. The controller of claim 7, wherein the controller comprises a digital-to-analogue converter (DAC) configured to output a voltage having a magnitude that corresponds to the under-voltage threshold or the restart threshold, and a comparator configured to compare the output voltage of the DAC with the input voltage, and the controller determines that the input voltage has dropped below the under-voltage threshold or has exceeded the restart threshold when the output of the comparator changes.

9. The controller of claim 8, wherein when operating in error mode the controller increases the level of the DAC until the output of the comparator changes, in response to the change in the output of the comparator the controller decreases the level of the DAC by a fixed amount, and the controller switches to under-voltage mode in the event that the output of the comparator subsequently changes.

10. A controller for a brushless motor, the controller being configured to operate in normal mode and under-voltage mode, wherein:
   when operating in normal mode the controller generates control signals for exciting a winding of the motor, monitors the magnitude of an input voltage, and switches to under-voltage mode in the event that the input voltage drops below an under-voltage threshold;
   when operating in under-voltage mode the controller suspends excitation of the winding, monitors the magnitude of the input voltage, monitors the magnitude of a supply voltage used to power the controller, switches to normal mode in the event that the input voltage exceeds a restart threshold, and resets itself in the event that the supply voltage drops below a brown-out threshold;

the controller comprises a digital-to-analogue converter (DAC) configured to output a voltage having a magnitude that corresponds to the under-voltage threshold or the restart threshold, and a comparator configured to compare the output voltage of the DAC with the input voltage; and the controller determines that the input voltage has dropped below the under-voltage threshold or has exceeded the restart threshold when the output of the comparator changes.

11. The controller of claim 10, wherein the controller uses an under-voltage threshold that differs from the magnitude of the input voltage by a fixed amount, the controller increases the level of the DAC until the output of the comparator changes, and in response to the change the controller decreases the level of the DAC by a fixed amount such that the output voltage of the DAC differs from the input voltage by a fixed amount.

* * * * *